United States Patent [19]
Goode

[11] 3,894,342
[45] July 15, 1975

[54] DEVICE FOR OBTAINING ANGULAR DEVIATION FROM AN INCLINED SURFACE

[76] Inventor: Sterling L. Goode, P.O. Box 108, Newark, Calif. 94560

[22] Filed: July 22, 1974

[21] Appl. No.: 490,911

Related U.S. Application Data

[63] Continuation-in-part of Ser. No. 318,092, Dec. 26, 1972, abandoned.

[52] U.S. Cl. .................................................. 33/388
[51] Int. Cl. .......................................... G01c 9/28
[58] Field of Search ............. 33/347, 384, 388, 391, 33/399, 400

[56] References Cited
UNITED STATES PATENTS

| | | | |
|---|---|---|---|
| 1,359,882 | 11/1920 | MacDonald | 33/388 |
| 1,370,233 | 3/1921 | Spier | 33/391 |
| 2,298,072 | 10/1942 | Somerville et al. | 33/400 |
| 2,535,791 | 12/1950 | Fluke | 33/347 |
| 3,160,961 | 12/1964 | Linehan | 33/388 X |
| 3,724,087 | 4/1973 | Ostrager | 33/384 X |

FOREIGN PATENTS OR APPLICATIONS

| 63,165 | 10/1912 | Switzerland | 33/391 |
|---|---|---|---|

*Primary Examiner*—Richard E. Aegerter
*Assistant Examiner*—Charles E. Phillips

[57] ABSTRACT

The device of the present invention is useful for measuring angles. A rotatable circular ring having two spirit levels at right angles to one another is mounted within a square-shaped frame. A pair of transparent plates prevent dirt from entering within the frame. The ring is accessible and may be rotated from one side of the frame. There are angle indicia within the device to indicate the angular displacement of the ring relative to the frame. The frame is no more than about three inches on a side and no more than about 1½ inches thick so that it can fit within a pocket.

4 Claims, 5 Drawing Figures

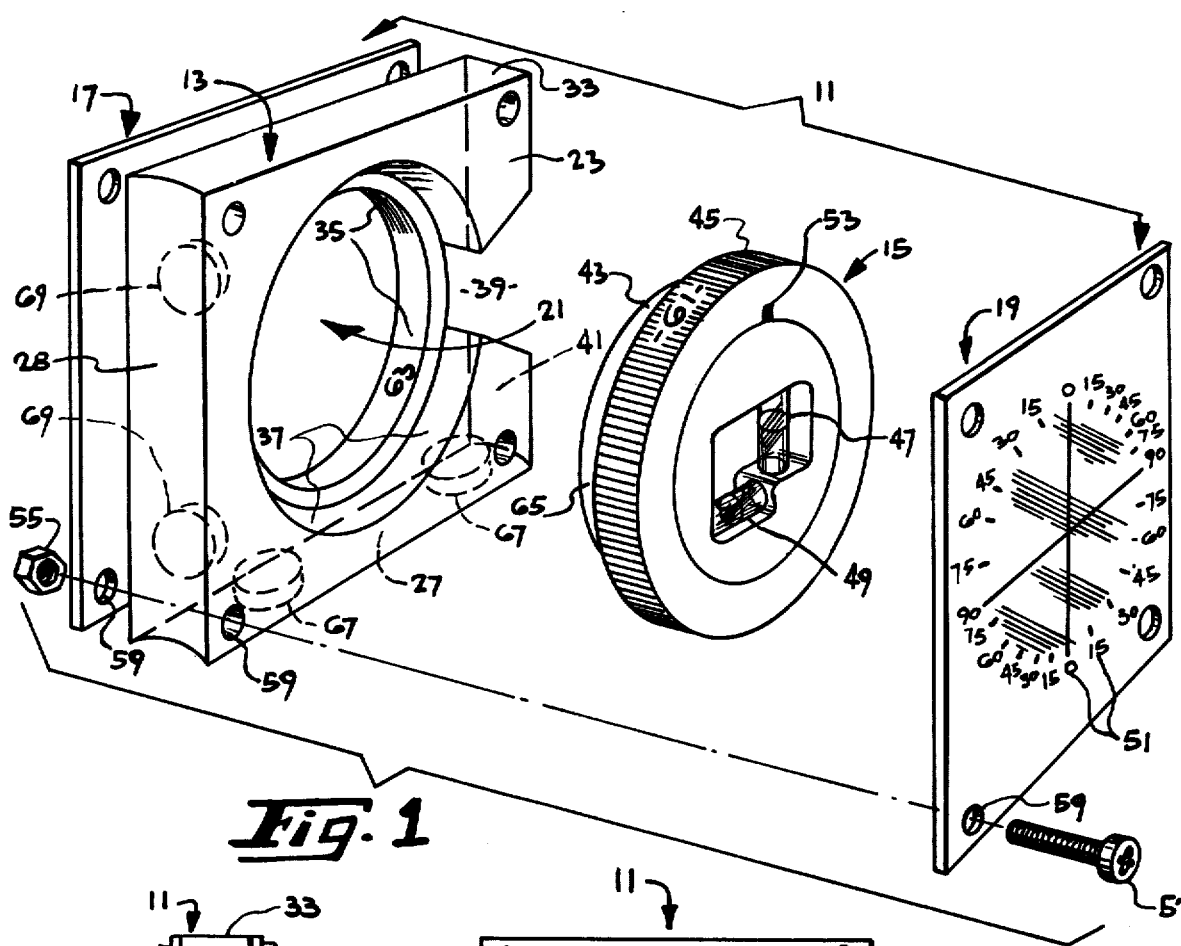
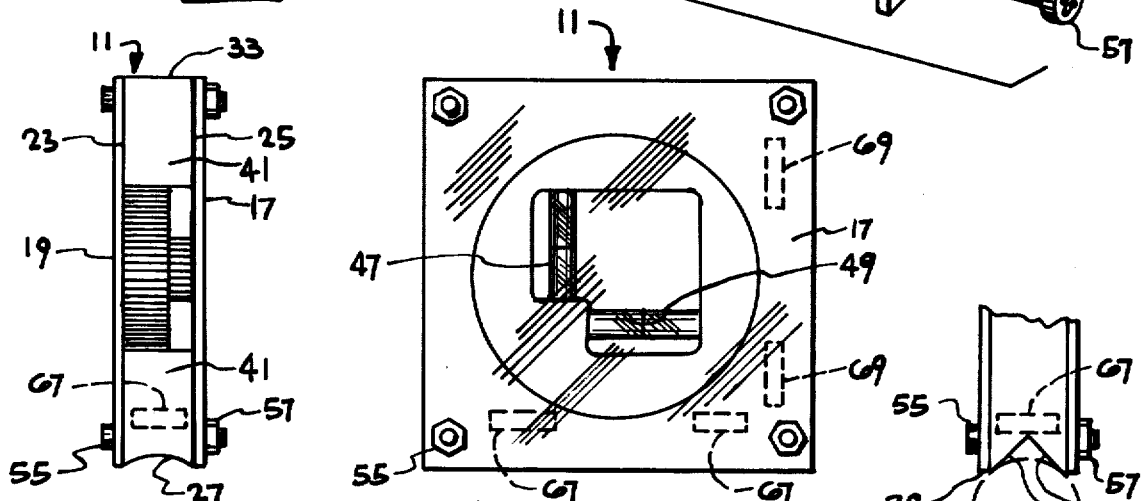
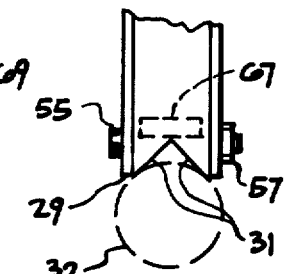
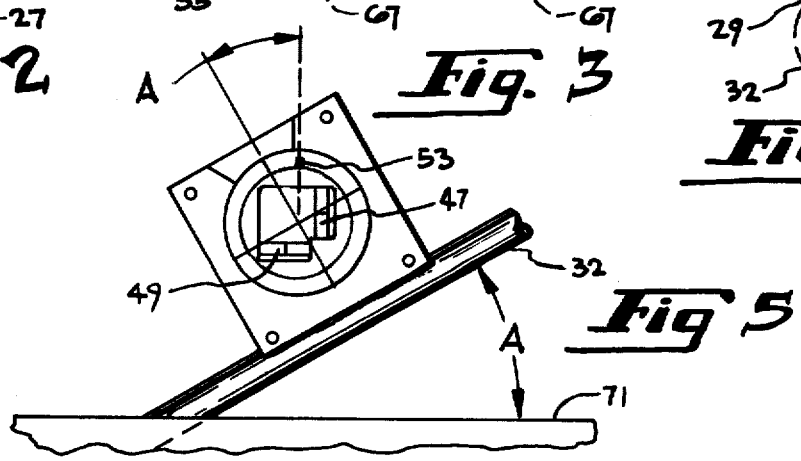

DEVICE FOR OBTAINING ANGULAR DEVIATION FROM AN INCLINED SURFACE

CROSS-REFERENCE

This application is a continuation-in-part of application Ser. No. 318,092 which was filed on Dec. 26, 1972 now abandoned.

BACKGROUND OF THE INVENTION

The invention is related to a device for obtaining any angular deviation from an arbitrarily inclined surface and more particularly, relates to a frame means having at least two spirit levels rotatably mounted therein with a fixed 90° separation therebetween.

A number of devices are known for obtaining the angular deviation from an inclined surface. U.S. Pat. Nos. 555,771; 756,949; 1,359,882 and 2,993,281 are illustrative of prior art devices.

The prior art devices for measuring angles are not, however, adaptable for easy use both when measuring angles from a parallel surface and when measuring angles from a pipe. Also the prior art devices are not protected from having dirt enter the bearing surfaces upon which they rotate. Further the devices of the prior art do not include their angle indicia within said devices and hence these indicia can potentially be rubbed off or defaced. Still further, the devices of the prior art generally require the use of two hands to adjust their rotatably mounted spirit levels.

It would be advantageous to provide a device which solved all of the problems previously mentioned. It would be still further advantageous to provide such a device which further included means for magnetically coupling the device in proper alignment with a pipe or the like. The present invention provides just such a device.

SUMMARY OF THE INVENTION

The invention comprises a compact angle measuring device. The device is useful for obtaining angular deviation from an inclined surface, which inclined surface may be a flat planar surface or may be a curved surface such as for example the surface of a pipe. The device includes a generally right rectangular parallelepiped frame including a pair of square bases and four lateral faces, at least one of the lateral faces being adapted to fit lengthwise against and parallel to a pipe and at least one other of the faces being adapted to fit flatly against a planar surface. The frame has a circular cylindrical hole generally centrally therethrough from one square base to the other. The frame also has an opening leading from the hole to one of the faces. A circular ring is rotatably mounted within the hole. A pair of spirit levels are mounted within the ring in perpendicular and adjacent relation to one another, the levels being substantially parallel to the square bases. The levels are so located within the ring that neither of the levels passes through the center of the ring whereby both of the levels can be read when viewed from either of the bases. A pair of transparent plates which are substantially equal in size to the bases are attached matingly to the bases. A plurality of angle indicia are located within the device for indicating the angular displacement of the ring relative to the frame.

BRIEF DESCRIPTION OF THE DRAWING

For a more complete understanding of the device of the present invention reference may be had to the accompanying drawing which is incorporated herein by reference thereto and in which:

FIG. 1 is a blown-apart view in perspective illustrating an embodiment of the device of the present invention.

FIG. 2 is a side view of the embodiment illustrated in FIG. 1 in assembled form.

FIG. 3 is a back view of the embodiment illustrated in FIG. 1.

FIG. 4 illustrates a detail of an alternate embodiment of the invention.

FIG. 5 illustrates either embodiment in use measuring an angle from a pipe.

DESCRIPTION OF THE PREFERRED EMBODIMENTS

The invention can be better understood by reference to the drawing wherein like numbers denote like parts throughout.

The numeral 11 represents the entire device of the preferred embodiment of the invention. It will be seen that the device includes the frame 13, the circular ring 15 and the transparent plates 17 and 19. The frame 13 has a hole 21 therethrough from the front surface or base 23 thereof to the back surface or base 25 thereof. The faces 27 and 28 of the frame are concave to adapt said faces to fit positively lengthwise against and parallel to a pipe. In an alternate embodiment illustrated in FIG. 4, the face 29 of the frame has the groove 31 therein so that this face will fit positively lengthwise against and parallel to a pipe 32. The face 33 of the frame is flat so as to fit flatly against a planar surface as, for example, against a board.

The hole 21 includes a first portion thereof 35 starting adjacent the back base 25 and terminating intermediate the back base 25 and the front base 23 of a smaller diameter than a second portion thereof 37 starting where said first portion terminates and continuing to the front base 23.

An opening 39 is provided between the hole 21 and more particularly exclusively between the portion 37 of the hole 21 and one of the faces 41 of the frame.

The circular ring 15 includes one part thereof 43 adapted to mount rotatably and frictionally within the first portion 35 of the hole 21. The ring also has another or second part thereof 45 adapted to fit closely but substantially without friction within the second portion 37 of the hole 21. Within the ring 15 are the two spirit levels 47 and 49 at right angles to one another.

The plate 19 has on the interior thereof in the preferred embodiment of the invention indicia 51 of angles. When the ring 15 is rotated within the hole 21 the angular displacement of the ring relative to the frame is indicated by the relative placement of the mark 53 on the ring 15 as compared to the scale of indicia 51 on the inside of the plate 19.

The device 11 is assembled by fastening the nuts 55 to the bolts 57 through the holes 59 which pass through the plate 19, the frame 13 and the plate 17. When the plates are in place, rotation of the ring 15 is accomplished by finger pressure upon the ring 15 at the opening 39. The surface 61 of the second part 45 of the ring 15 is Knurled (made of a roughened texture) so as to allow easy adjustment of the angle of the ring 15 in this manner. If desired, the device can be held in one hand and the ring rotated using a finger or a thumb. This frees the other hand for other uses. Also when the plates 17 and 19 are in place, the contacting surfaces 63 of the hole 21 and 65 of the ring 15 are protected from dirt entering between them. This is because the only opening which comes even close to these surfaces is the opening 39 whereby only the rough textured surface of the second part of the ring is accessible through the opening thus protecting the rotatable frictional mounting of said first part of said ring within said first portion of said hole from dirt.

Since both the plate 17 and the plate 19 are of transparent material and since the spirit levels 47 and 49 are placed within the ring so that neither of the levels passes through the center of the ring both of the levels can be read from both the direction of the base 23 and the direction of the base 25.

As is further illustrated in the drawing, in the preferred embodiment of the invention the device includes means within the frame, adjacent the face or faces that are adapted to fit against a pipe, for magnetically coupling the frame to the pipe. In the embodiment shown, the means for magnetically coupling the frame to the pipe comprise the magnets 67 adjacent the face 27 and the magnets 69 adjacent the face 28.

Operation of the device of the present invention to determine an angle relative to a pipe is relatively straightforward and is fully illustrated in FIG. 5. If one has pipe 32 at an arbitrary angle A from a horizontal plane 71 as illustrated in FIG. 5 and one wishes to know what the deviation of this pipe is from the horizontal, a face of the device, e.g., either of the faces 27 or 28 of FIG. 1 or the face 29 of FIG. 4, which is adapted to fit lengthwise and parallel to the pipe is fitted in position against the pipe. Thereafter the ring 15 is rotated until the level 49 is in a horizontal position as indicated by centering of the bubble therein. The deviation of the pipe from the horizontal can then be read off as equal to the angle indicated by the marker 53 on the indicia scale 51. If it is desired to determine an arbitrary angle from a flat member such as a board, the face 33 of the device is placed against the board and the device is used in a like manner.

It should be noted, of course, that the indicia scale if desired can alternately be placed on, for example, the base 23 of the frame 13. In this position the scale would still be protected by the plate 19 from being rubbed off.

If it is desired to determine an angle which is a desired number of degrees, for example, 30° from the arbitrarily inclined pipe 32, the following steps can be performed. First, the angle A at which the pipe is tilted from the horizontal plane 71 is determined as previously described. Then the ring 15 is rotated the desired number of degrees, from the angle A using the indicia 51 and the mark 53. Finally, the device 1 is rotated as a unit until the level 49 is again horizontal. The angle resulting between the face of the device adjacent the pipe will then be equal to the desired number of degrees.

As previously stated, the plates 17 and 19 protect the interior of the device 1 from dirt and in particular, protect the space between the surfaces 63 and 65 from dirt. Also, the device may be easily dissembled for cleaning as by simply removing the nuts 55 and the bolts 57.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A compact angle measuring device comprising:

a generally right rectangular parallelepiped frame including a pair of square bases and four lateral faces, at least one of said faces having a concave contour adapted to fit lengthwise against and parallel to a pipe, at least one other of said faces being adapted to fit flatly against a planar surface, said frame having a circular cylindrical hole generally centrally therethrough from one square base to the other and an opening leading from said hole to one of said faces;

a circular ring rotatably mounted within said hole, said ring having a peripheral portion exposed in said opening to provide access to said ring of a person's finger for angular adjustment of said ring;

a pair of spirit levels mounted within the ring in perpendicular and adjacent relation to one another, the levels being substantially parallel to said square bases, the levels being so located within the ring that neither of the levels passes through the center of the ring whereby both of the levels can be read when viewed from either of the bases;

a pair of transparent plates substantially equal in size to said bases attached matingly to said bases; and a plurality of angle indicia adjacent said rings for indicating the angular displacement of said ring relative to said frame.

2. A device as in claim 1, wherein said hole comprises a first portion starting adjacent said one of said bases and terminating intermediate said bases and a second portion starting where said first portion terminates and continuing to the other of said bases, the diameter of said first portion being smaller than the diameter of said second portion;

said circular ring includes a first part adapted to rotatably and frictionally mount within said first portion of said hole and a second part adapted to fit closely but substantially without friction within said second portion of said hole, the cylindrical surface of said surface of said second part having a knurled periphery to provide good positive contact therewith for rotating said ring; and said opening leads exclusively from said second portion of said hole to said one of said faces whereby only the knurled surface of said second part of said ring is accessible through said opening thus protecting the rotatable frictional mounting of said first part of said ring within said first portion of said hole from dirt.

3. A device as in claim 2 wherein said indicia are located on the surface of one of said plates which mates with said one of said bases.

4. A device as in claim 3 further comprising means within said frame adjacent said one face that is adapted to fit against the pipe for magnetically coupling said frame to said pipe.

* * * * *